June 21, 1955 F. S. BUTLER 2,711,260
HAND TRUCK ELEVATING OR LOWERING ATTACHMENT
Filed July 3, 1953 2 Sheets-Sheet 1
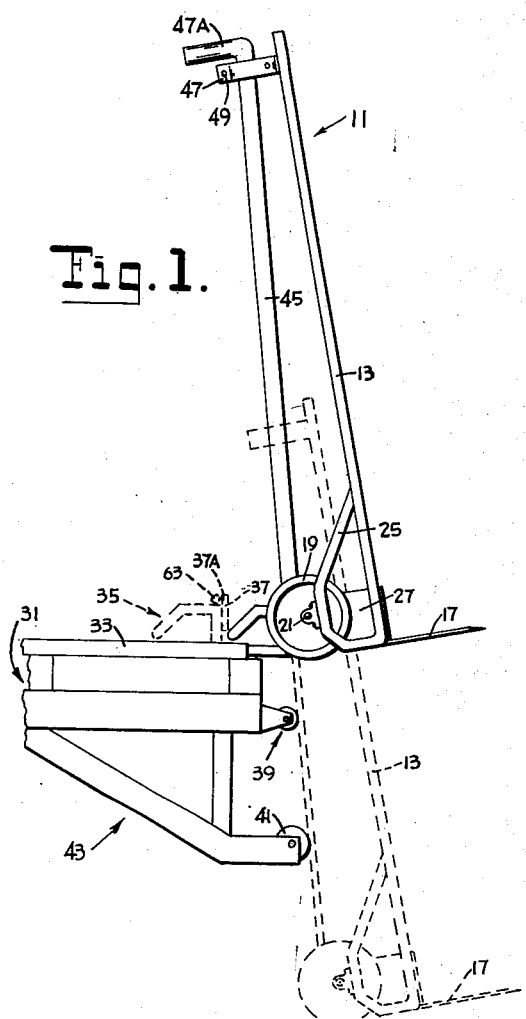
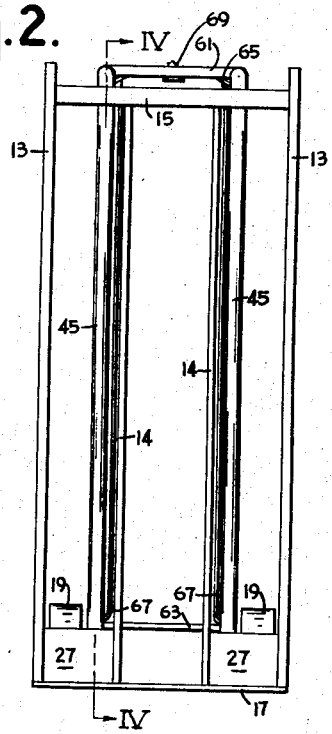
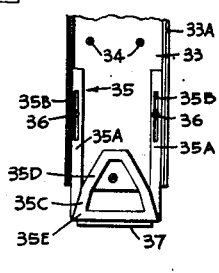
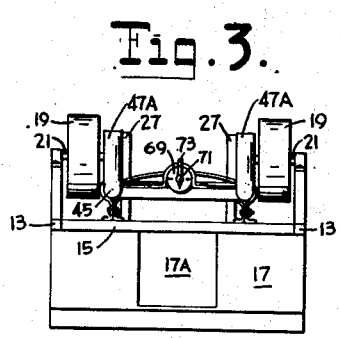
INVENTOR
FRAZIER S. BUTLER
BY
Weatherford and Weatherford
attys June 21, 1955　　　　　F. S. BUTLER　　　　　2,711,260
HAND TRUCK ELEVATING OR LOWERING ATTACHMENT
Filed July 3, 1953　　　　　　　　　　　　　2 Sheets-Sheet 2

INVENTOR
FRAZIER S. BUTLER
BY
Weatherford and Weatherford
attys

United States Patent Office 2,711,260
Patented June 21, 1955

2,711,260

HAND TRUCK ELEVATING OR LOWERING ATTACHMENT

Frazier S. Butler, Memphis, Tenn.

Application July 3, 1953, Serial No. 365,800

11 Claims. (Cl. 214—515)

This invention relates to a hand truck, and more particularly it relates to a hand truck having attached thereto a variable-speed dash-pot-type hydraulic device for safely and easily lowering said hand truck from an elevated platform, such as a vehicle tail gate.

Specifically the invention relates to a hand truck, basically of conventional construction, having manipulating handles, hydraulic cylinder and piston means interposed between said handles and said hand truck proper, valve-controlled circulating conduit means for conducting hydraulic fluid from one end of said hydraulic cylinder and piston means to the other, and abutment means engageable with an elevated platform for engaging and holding the handle-connected part of said hydraulic means whereby said hand truck can be lowered from said platform easily, safely and at a speed controllable by the valve means in said circulating conduits.

While it has heretofore been proposed to provide means associated with a vehicle bed for lowering objects to be unloaded therefrom, such devices have been of complicated and expensive construction and have had the further disadvantage that the handled objects could not be unloaded thereby while being supported on a hand truck. This invention overcomes these disadvantages of the prior art.

It is a principal object of this invention to provide a hand truck having a very simple and easily operable device for lowering the same from a vehicle tail gate or other elevated platform.

It is another object to provide a hand truck having a variable-speed smoothly acting hydraulic device for lowering the same from an elevated platform.

It is a further object to provide a highly effective, yet inexpensive, device of the type disclosed.

It is a further overall object to generally improve the design and efficiency of hand trucks of the class disclosed.

The means by which the foregoing and other objects of the present invention are accomplished and the manner of their accomplishment will be readily understood from the following specification upon reference to the accompanying drawings, in which:

Fig. 1 is a side elevational view of a preferred embodiment of the invention.

Fig. 2 is a front elevational view of the hand truck proper of Fig. 1.

Fig. 3 is a plan view of the showing Fig. 2.

Fig. 8 is an enlarged plan view of an abutment device for use on a vehicle.

Figure 4:
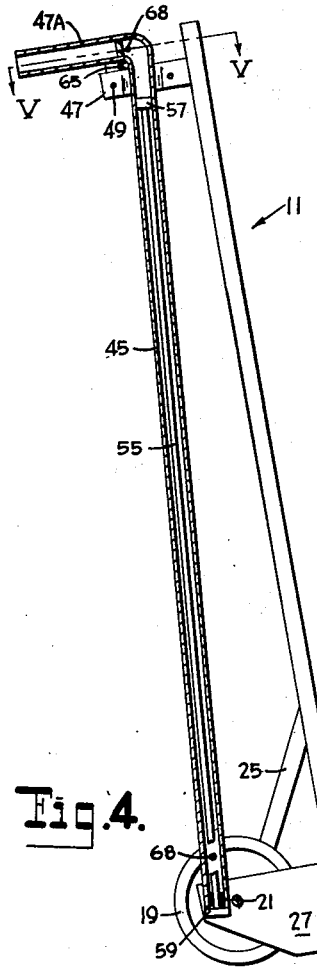
Fig. 4 is an enlarged elevational view in vertical axial section taken on the line IV—IV of Fig. 2.

Referring now to the drawings, the numeral 11 generally designates a hand truck embodying a preferred form of the invention. Hand truck 11 comprises a pair of upright substantially parallel side frame members 13 and an intermediate pair of frame members 14 (which may be of lighter-weight material) approximately parallel to and trisecting the space between side frame members 13. The frame members 13 and 14 are rigidly interconnected adjacent their upper ends by a transverse frame member 15 welded or otherwise connected at its ends thereto. The frame members 13, 14 and 15 are preferably formed of metal bars or tubes and are illustrated herein as being of rectangular (square) cross-section. The side frame members 13 are interconnected at their lower ends by the toe plate 17 fastened thereto at the ends of its rear edge by the wheel-carrying structure next to be described.

Truck 11 is perambulatorily supported on a pair of wheels of generally conventional construction each being rotatably mounted on one of a pair of coaxially alined horizontally disposed axles 21. The outer end of each axle 21 is received in a bore in a block 23, which optionally may serve as a bearing for axle 23, if wheel 19 is fixed thereto. Each block 23 is mounted on a bracket 25, which can be formed as a bent looped extension of side frame member 13, as shown, or be formed separate therefrom and welded at its ends thereto. The inner end of each axle 21 is similarly fastened to, or journaled in a bore in, one of a pair of vertically disposed substantially parallel plates or gussets 27, which approximately trisect the lateral extent of the lower portion of hand truck 11. Traversing the spaces between gussets 27 and side frame members there may be inserted a pair of frame-rigidifying face plates 29, which preferably are welded between opposed faces of frame members 13 and 14, the gussets being welded to the rear faces of the intermediate frame members 14 adjacent or overlapping their junction with face plates 29.

The apparatus for lowering the hand truck from a vehicle tail gate or other elevated platform (generally designated 31 in Fig. 1) comprises abutment and guide structures adapted for attachment to said platform 31, and co-operating hydraulic means mounted on the hand truck 11.

The abutment structure (Figs. 1 and 8) is almost identical with the equivalent part of another hand truck with lowering means, described and claimed in applicant's co-pending application Serial Number 363,357, filed June 22, 1953, to which reference may be made for a detailed description of the structure. Briefly said abutment structure comprises a shallow sheet-metal pan-like base 33 having parallel upturned side flanges 33A. Base 33 may be attached to the platform 31, as by screws 34 passing through holes therein. Resting upon the base 33 is the abutment device proper 35. Abutment device 35 has a pair of parallel sled-runner-like portions 35A lying along and guided by the flanges 33A. Portions 35A are provided with longitudinal slots 35B which permit longitudinal shift of the abutment device 35 relative to the anchoring studs 36. The abutment portions 35A are bridged by an elevated rearwardly pointed roughly V-shaped portion 35C the rear end part 35D of which is downwardly inclined to constitute a cam-like surface to insure proper lifting of the co-operating part of the lowering apparatus carried by the hand truck 11. The upwardly disposed front sections 35E have fixed to their front faces a stop plate 37 having its upper horizontally disposed margin 37A extending somewhat above the top of the abutment member proper (35) for a purpose later to be described.

To the edge of platform 31 is attached a pair of low-friction guides, such as rollers 39. Below rollers 39 is another pair of guide rollers 41, so located as to define a slightly inclined guide path, as shown. Guide rollers 41 may be mounted in any convenient manner, as for example, on a bracket structure 43, anchored to the under side of platform 31.

The co-operating lowering structure carried by the hand truck 11 comprises a pair of hydraulic cylinders 45 held for vertical sliding movement relative to the hand truck 11 proper by a pair of slide guides 47 attached, as by screws 48, to the rear face of the upper transverse frame member 15, as shown. Screws 49 provide adjustment for the guide diameter. The upper ends of cylinders 45 may be rearwardly bent to form handle 47A, which handles also constitute filling tubes through which hydraulic fluid may be introduced into the cylinders. Handles 47A are provided close-fitting closure means, such as plug-like discs, screwed or otherwise anchored in the passage therein.

Each cylinder has an apertured cylinder-head through which the piston rods 55 fluid-tightly pass (conventional packing means, not shown, may be used). Piston rods 55 carry pistons 57 on their upper ends, and are preferably long enough to permit the pistons to travel almost the full length of the cylinder bores. The lower ends of piston rods 55 are firmly attached to the truck proper, as by being fastened to blocks 59 welded to gussets 27, as shown.

The pair of cylinders 45 are interconnected near their upper ends by a transverse bar 61 and adjacent their lower ends by cross bar 63. Bars 61 and 63 may be welded or otherwise fixed to the cylinders to form a rigid rectangular truck-handling frame. The lower cross bar 63 is the part of the lowering mechanism that rides up onto the abutment structure 35 and come to rest against the stop plate 37.

The rate of lowering is controlled by a by-pass fluid-circulating system comprising a fluid conduit 65 leading into the top of each cylinder 45, a conduit 67 leading from the bottom of each cylinder 45, each cylinder being apertured as at 68 (Fig. 4) to receive conduits 65, 67, and a double-passage valve 69 for simultaneously and equally (variably) controlling the passage of fluid externally from one end of each cylinder to the other end thereof. Valve 69 is preferably located on the rear central portion of the upper transverse bar 61 of the cylinder frame. Valve 69 is provided with a handle 71 or other means for manipulation thereof and with a pointer 73 or other means for indicating closed, open or partly open conditions thereof.

Figure 5:
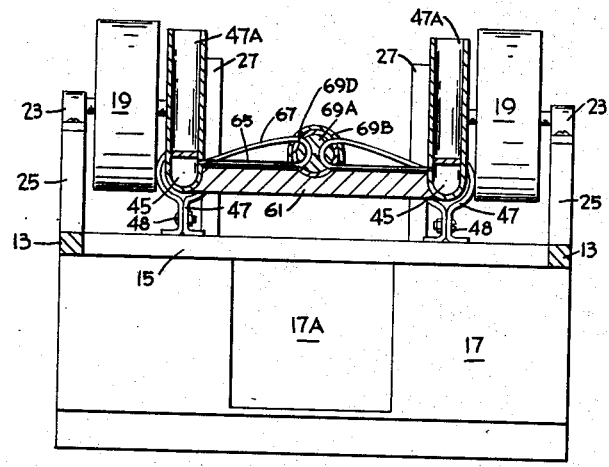
Fig. 5 is a further enlarged plan view of the disclosure of Fig. 4 in section taken on the line V—V of Fig. 4.
Figure 6:
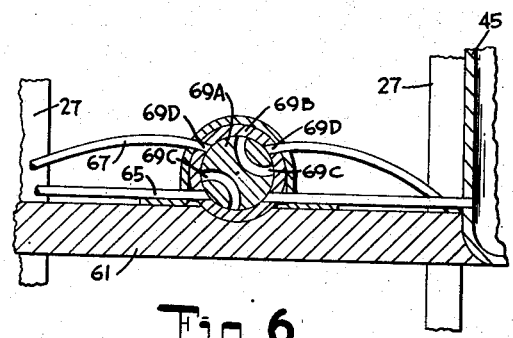
Fig. 6 is a fragmentary enlargement of the showing of Fig. 5, but with the valve core rotated to its closed position.
Figure 7:
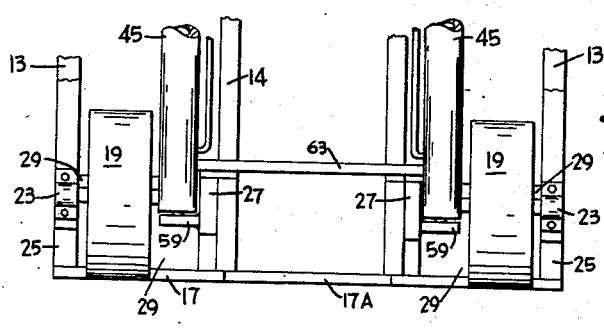
Fig. 7 is a fragmentary enlarged rear elevational view of the lower left portion of the hand truck.

As shown in Figs. 5 and 6, valve 69 can conveniently be formed by a rotating cylindrical core 69A, seated in a cylindrical body 69B. Core 69A has a pair of channels 69C which may be made to register with inlet and outlet openings 69D in cylindrical body 69B, when and to the degree desired.

The toe plate 17 is provided with a centrally located cut-out area 17A to permit the truck 11 to pass over and along the abutment structure 35 as the truck is wheeled toward the edge of platform 31 and in straddling relationship to abutment member 35.

In use the hand truck 11 is wheeled over the abutment member 35, being centered thereover by the pointed rear end 35C of the abutment member 35 and by the side edges of opening 17A in toe plate 17 engaging the sides of the abutment member. When bar 63 engages stop plate 37 the truck 11 is ready for lowering. Then valve 69 is opened to the degree desired. Fluid then passes from the bottom of the cylinder 67, through apertures 68, through the conduits 67, through valve 69, and through conduits 65 into the top of cylinders 45, until the truck reaches the ground. During the descent, the worker holds the handles to guide the truck down over the rollers 39 and 41 over which the cylinders 45 roll. If desired, descent may be interrupted by shifting valve 69 to closed position, interrupting fluid flow and stopping piston movement. When the truck reaches the ground, the cylinders will drop by gravity when released, the fluid merely reversing its direction of flow, when the valve is open, through the conduits and valve, returning to the opposite end of the cylinders.

I claim:

1. A hand truck comprising an elongated body frame adapted for rearwardly tilted upright disposition in normal use, a pair of wheels supporting said body frame, at least one handle for manipulating said hand truck, hydraulic means connecting said handle to said hand truck and including a cylinder and a piston rod having a piston head attached thereto, one of said cylinder and piston rod being attached to said body frame and the other being attached to said handle, whereby fluid in said cylinder may control the rate of lowering of said frame away from said handle, conduits for circulating the fluid between the upper and lower ends of said cylinder, and variable valve means for controlling the rate of flow of said fluid and thereby the speed of the lowering operation.

2. In a hand truck, an elongated load-carrying frame structure adapted for rearwardly tilted upright disposition in normal use, low-friction means perambulatorily supporting the lower front portion of said frame structure, at least one hydraulic cylinder adjacent the rear portion of said frame structure, guide means vertically slidably attaching said cylinder to said frame structure, a piston head and piston rod movable in said cylinder, the lower end of said piston rod being attached to said frame structure, and handle means attached to said cylinder, whereby said handle and attached cylinder may be held at an elevated position while said frame structure and attached piston rod may be lowered under the retarding action of fluid in said hydraulic cylinder, said handle means being a tubular extension of said cylinder and rearwardly angularly disposed relative thereto, and being provided with a removable means for closing the bore thereof whereby said extension may be used as a fill pipe for introducing fluid into said cylinder.

3. In combination, an elongated load-carrying frame structure adapted for rearwardly tilted upright disposition in normal use, low-friction means perambulatorily supporting the lower front portion of said frame structure, a pair of hydraulic cylinders vertically symmetrically disposed behind said frame structure, pairs of piston rods and pistons axially movable in said cylinders under the retarding action of fluid therein, a horizontally disposed tie-element rigidly interconnecting said cylinders adjacent their lower ends, the upper ends of said cylinders being slidably guidably attached to the upper portion of said frame structure, handles attached to the upper portions of said cylinders, means attaching the lower ends of said piston rods to said frame structure, and abutment means adapted for mounting on an elevated platform and having stop means for arresting and firmly holding said tie-element, whereby said frame structure and a load carried thereby may be supported by said tie-element and said cylinders connected thereto for fluid-retarded lowering thereof by the pistons and piston rods attached to and movable with said frame structure.

4. Structure according to claim 3, said abutment means including a plow-like member for guiding said tie-element into load-balancing orientation relative to said stop means and for raising said tie-element, if necessary, to stop-engaging elevation.

5. Structure according to claim 4 and additionally comprising a toe plate attached to the lower portion of said frame structure, said toe plate being centrally recessed from its rear edge to provide an opening for guidingly receiving said abutment device.

6. Structure according to claim 5, said abutment means being adjustable toward and away from the edge of said platform.

7. Structure according to claim 3, and additionally comprising conduits connecting the upper and lower ends of said cylinders, and a double-passage valve for simultaneously, variably, and substantially equally controlling the rate of circulation of said fluid.

8. In a hand truck, an elongated load-carrying frame in rearwardly tilted upright disposition in normal use, means supporting said frame for movement from place to place, hydraulic cylinder means substantially vertically disposed rearward of said frame adapted to contain a supply of hydraulic fluid, guide means rigidly connected to and rearwardly projecting from said frame adjacent the upper end of said frame, said guide means slidably embracing said cylinder means, said cylinder means housing vertically shiftable piston means and elongated rod means connected to and extending below the related piston means, said rod means being of a length to extend substantially throughout the length of said cylinder means, the lower end of said rod means being rigidly connected to said frame below said cylinder means, said cylinder means being ported adjacent its upper end above said piston means and adjacent its lower end above the connection of said rod means to said frame to provide inflow and outflow ports for hydraulic fluid to and from the interior of said cylinder means, conduit means interconnecting the ports of said cylinder means, and valve means interposed in said conduit means for controlling fluid flow through said conduit means, downward movement of said frame relative to said cylinder means moving to project said frame below said cylinder means and to extend said rod means downwardly, shifting said piston means against the fluid contained in said cylinder means, said movement effecting outflow through the lower of said ports below said piston and inflow from said conduit means through the upper of said ports, downward movement of said cylinder means relative to said frame moving said cylinder means downwardly on said piston means against the fluid in said cylinder means above said piston means, effecting outflow from the upper of said ports and inflow from said conduit means through the lower of said ports, closure of said valve means cutting off fluid flow and locking said frame and cylinder means against relative downward movement.

9. In a hand truck, an elongated load-carrying frame in rearwardly tilted upright disposition in normal use, means supporting said frame for movement from place to place, a pair of hydraulic cylinders substantially vertically disposed rearward of said frame adapted to contain a supply of hydraulic fluid, a pair of guide members rigidly connected to and rearwardly projecting from said frame adjacent the upper end of said frame, said guide members respectively slidably embracing said cylinders, each said cylinder housing a vertically shiftable piston and an elongated rod connected to and extending below its related piston, said rods each being of a length to extend substantially throughout the length of said cylinders, the lower ends of said rods being rigidly connected to said frame below said cylinders, each said cylinder being ported adjacent its upper end above said pistons and adjacent its lower end above the connection of said rods to said frame to provide inflow and outflow ports for hydraulic fluid to and from the interior of said cylinders, conduit means interconnecting the ports of each cylinder, and valve means interposed in said conduit means for controlling fluid flow through said conduit means, downward movement of said frame relative to said cylinders moving to project said frame below said cylinders and to extend said rods downwardly, shifting said pistons against the fluid contained in said cylinders, said movement effecting outflow through the lower of said ports below said piston and inflow from said conduit means through the upper of said ports, downward movement of said cylinders relative to said frame moving said cylinders downwardly on said pistons against the fluid in said cylinders above said pistons effecting outflow from the upper of said ports and inflow from said conduit means through said lower ports, closure of said valve means cutting off fluid flow and locking said frame and cylinders against relative downward movement.

10. In combination, an elongated load-carrying frame structure adapted for rearwardly tilted upright disposition in normal use, means supporting the lower portion of said frame structure for movement from place to place, a pair of hydraulic cylinders vertically symmetrically disposed behind said frame structure, pairs of piston rods and pistons axially movable in said cylinders under the retarding action of fluid therein, a tie-element rigidly interconnecting said cylinders adjacent their lower ends, the upper end of said frame being slidably guidably attached to said cylinders, handles attached to the upper portions of said cylinders, means attaching the lower ends of said piston rods to said frame structure, whereby said frame structure and a load carried thereby may be supported by said tie-element and said cylinders connected thereto for lowering thereof, said lowering being fluid-retarded by the pistons and piston rods attached to and movable with said frame structure.

11. In combination, an elongated load-carrying frame structure adapted for rearwardly tilted upright disposition in normal use, means supporting the lower portion of said frame structure for movement from place to place, a pair of hydraulic cylinders vertically symmetrically disposed behind said frame structure, pairs of piston rods and pistons axially movable in said cylinders under the retarding action of fluid therein, a tie-element rigidly interconnecting said cylinders adjacent their lower ends, the upper end of said frame being slidably guidably attached to said cylinders, means attaching the lower ends of said piston rods to said frame structure, whereby said frame structure and a load carried thereby may be supported by said tie-element and said cylinders connected thereto for lowering thereof, said lowering being fluid-retarded by the pistons and piston rods attached to and movable with said frame structure, and conduit means communicating the respective upper and lower ends of said cylinders for fluid flow therebetween under the action of said pistons on the fluid in said cylinders.

References Cited in the file of this patent
UNITED STATES PATENTS

| | | |
|---|---|---|
| 2,418,494 | Anthony et al. | Apr. 8, 1947 |
| 2,598,489 | Bayer et al. | May 27, 1952 |
| 2,598,730 | Thompson et al. | June 3, 1952 |
| 2,650,724 | Bill | Sept. 1, 1953 |

FOREIGN PATENTS

| | | |
|---|---|---|
| 529,605 | Great Britain | Nov. 25, 1940 |
| 801,755 | Germany | Jan. 22, 1951 |